Figure 1:
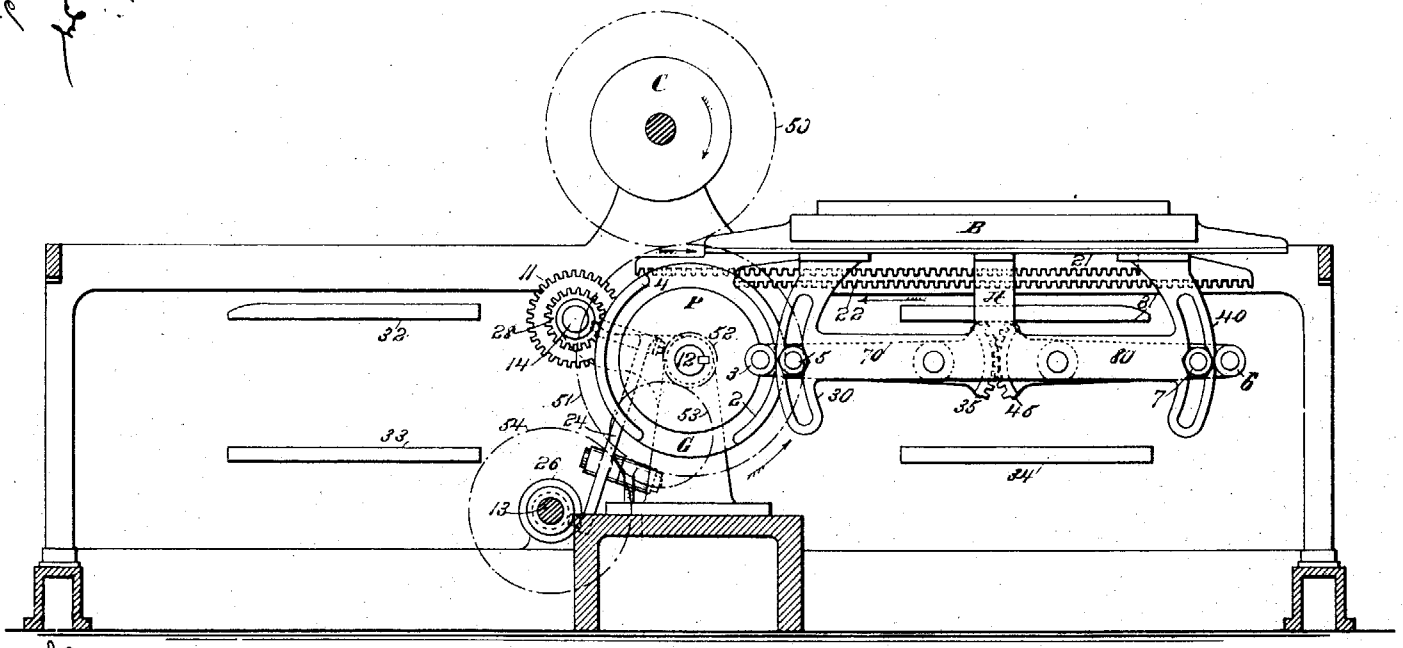

5 Sheets—Sheet 1.

L. C. CROWELL.

Assignor to R. Hoe, S. D. Tucker, T. H. Mead & C. W. Carpenter.

BED MOTION FOR CYLINDER PRINTING MACHINES.

No. 11,272. Reissued Sept. 27, 1892.

Attest:
J. J. Kennedy
T. F. Kehse.

Inventor
Luther C. Crowell,
by
Philip Thomson & Pfeifer,
Attys

5 Sheets—Sheet 2.

L. C. CROWELL.

Assignor to R. Hoe, S. D. Tucker, T. H. Mead & C. W. Carpenter.

BED MOTION FOR CYLINDER PRINTING MACHINES.

No. 11,272. Reissued Sept. 27, 1892.

Attest:
J. Kennedy
T. F. McKee

Inventor
Luther C. Crowell
by
Pierce, Mason & Phelps
Attys

5 Sheets—Sheet 3.

L. C. CROWELL.

Assignor to R. HOE, S. D. TUCKER, T. H. MEAD & C. W. CARPENTER.

BED MOTION FOR CYLINDER PRINTING MACHINES.

No. 11,272. Reissued Sept. 27, 1892.

Attest:
J. J. Kennedy
T. F. Kehoe

Inventor:
Lucius C. Crowell,
by
Philipp Munson & Philp,
Attys

L. C. CROWELL.

Assignor to R. Hoe, S. D. Tucker, T. H. Mead & C. W. Carpenter.

BED MOTION FOR CYLINDER PRINTING MACHINES.

No. 11,272. Reissued Sept. 27, 1892.

Attest:
J. J. Kennedy
T. F. Kehoe

Inventor
Lucius C. Crowell
by
Philipp Munson & Philipp
Attys

L. C. CROWELL.

Assignor to R. Hoe, S. D. Tucker, T. H. Mead & C. W. Carpenter.

BED MOTION FOR CYLINDER PRINTING MACHINES.

No. 11,272. Reissued Sept. 27, 1892.

Attest:
J. Kennedy
T. F. Kehoe.

Inventor:
Luther C. Crowell
by
Philip Thomas & Philip
Attys

UNITED STATES PATENT OFFICE.

LUTHER C. CROWELL, OF BROOKLYN, ASSIGNOR TO ROBERT HOE, STEPHEN D. TUCKER, THEODORE H. MEAD, AND CHARLES W. CARPENTER, ALL OF NEW YORK, N. Y.

BED-MOTION FOR CYLINDER PRINTING-MACHINES.

SPECIFICATION forming part of Reissued Letters Patent No. 11,272, dated September 27, 1892.

Original No. 480,454, dated August 9, 1892. Application for reissue filed August 30, 1892. Serial No. 444,594.

*To all whom it may concern:*

Be it known that I, LUTHER C. CROWELL, a citizen of the United States, residing at the city of Brooklyn, county of Kings, and State of New York, have invented certain new and useful Improvements in Bed-Motions for Cylinder Printing-Machines, fully described and represented in the following specification and the accompanying drawings, forming a part of the same.

This invention relates to improvements upon that shown in Letters Patent No. 5,200, granted to Richard M. Hoe July 24, 1847, and is especially designed for use in that class of printing-machines which have reciprocating type-beds that co-operate with rotating cylinders in making the impression, whether said machines have one or more such cylinders and whether said cylinder or cylinders oscillate or rotate periodically or continuously or in the same or opposite directions, or make one or any number of revolutions during each reciprocation of the type-bed. In short, the invention applies to a machine having a reciprocating bed, no matter how the impression is taken therefrom, although it is illustrated in connection with a printing-machine having a single impression-cylinder.

It is the object of this invention to provide a mechanism for retarding and stopping the movement of the bed in one direction and starting and accelerating it in the reverse direction at each end of its run, which shall perform these reversing operations so quickly as to minimize the time for their accomplishment, and thus provide for the attaining of the highest rate of speed of the machine without unduly modifying it in making such reversals of the bed at the ends of its stroke.

The invention consists, mainly, in combining with the rack-and-pinion mechanism, whereby the major part of the reciprocating movement is imparted to the type-bed, two swinging levers pivoted to the bed and each provided at its free end with a stud that is engaged near the end of the movement of the bed imparted by the rack-and-pinion mechanism by means of a pocket in the periphery of a revolving disk on the bed-driving-pinion shaft and carried by said pocket through a curved guideway provided by a rotating curved guard, which movement of the lever-stud thus carried through said curved guideway is equivalent to that of a crank, and hence the reversal of the bed at the end of its run in both directions is accomplished by a movement that is both powerful and smooth.

The above constitutes the more prominent feature of the invention. Other improvements, however, will appear in the course of the following detailed description of the mode in which the invention is or may be practically embodied or carried into effect, a ready understanding of which will be aided by reference to the accompanying drawings, in which—

Figure 2:
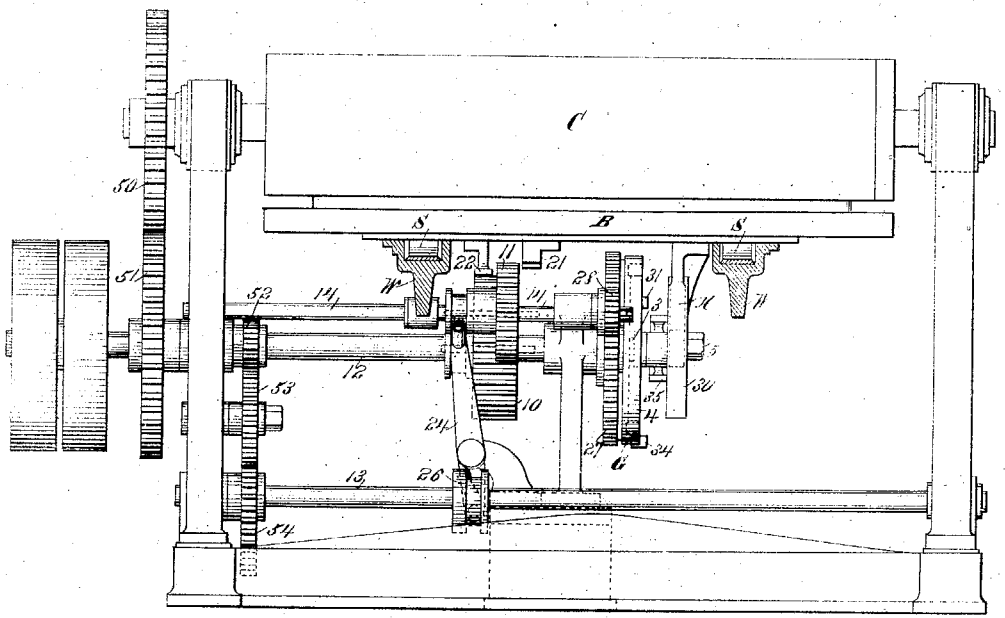
Figure 3:
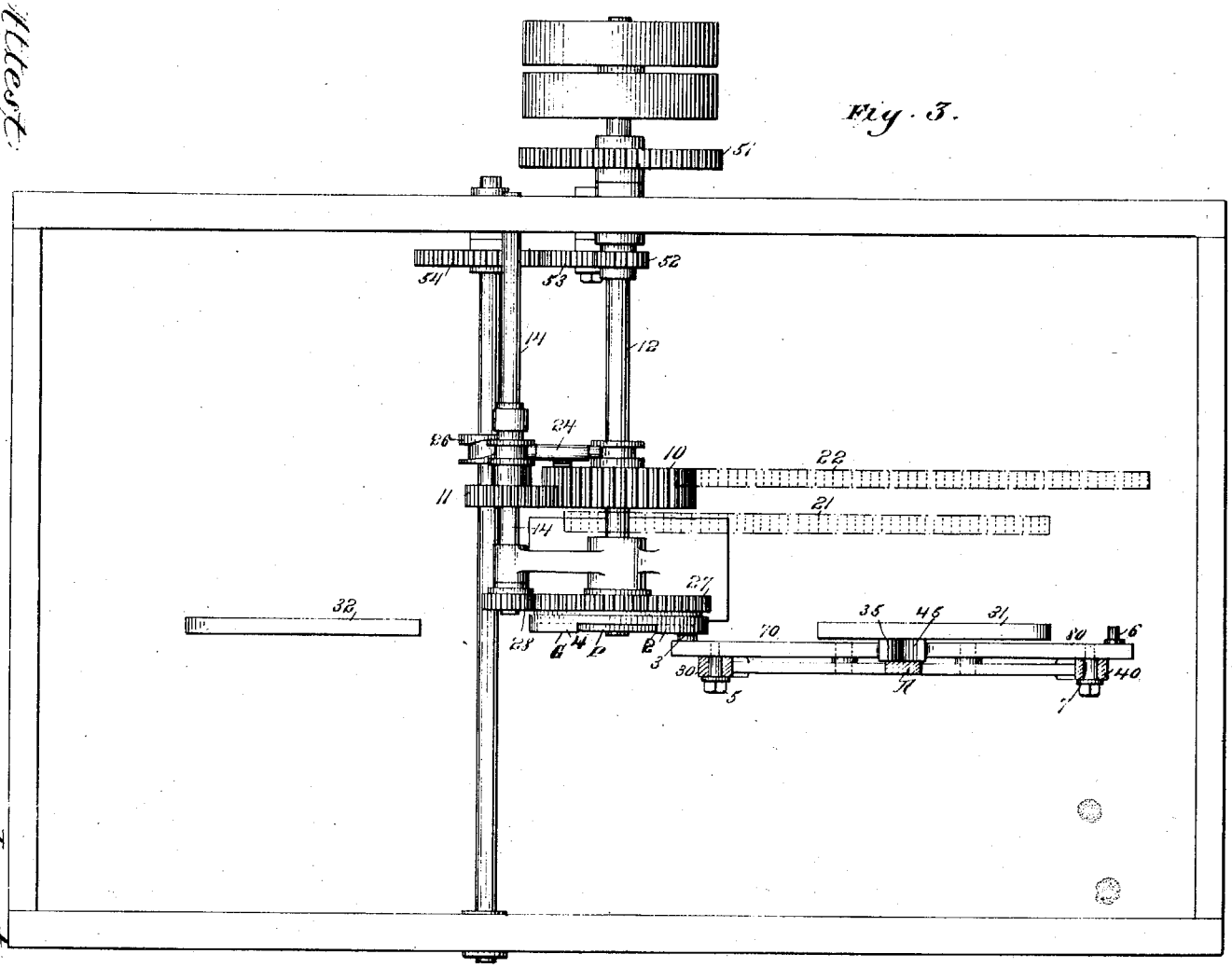

Figure 1 is a side elevation, the nearer side frame being removed; Fig. 2, an end elevation, and Fig. 3 a plan view taken just below the bed, of a printing-machine embodying the present improvements, while Figs. 4, 5, 6, 7, 8, 9, 10, and 11 are diagrams illustrating various positions assumed by the retarding, stopping, starting, and accelerating mechanisms during the operations of reversing the bed.

The printing-machine illustrated comprises the usual impression-cylinder C, mounted to revolve in suitable journals supported by the framework, which cylinder co-operates with a reciprocating type-bed B, that is supported by sliders S, which run in longitudinal ways W, supported by the framework. This cylinder C is rotated by means of a wheel 50 on its shaft, that is driven by a wheel 51 on a shaft 12, and a pinion 52, fast on said shaft 12 inside of the frame-gears through an intermediate pinion 53 with a wheel 54 on a shaft 13, which may be the main shaft, and from which some of the parts are directly driven. This shaft 12 also carries what is usually referred to as the "main driving-pinion" 10, because its movement determines that of the bed, said pinion 10 usually making, as it does in this instance, three revolutions to each reciprocation of the bed—namely, a full revolution as the bed makes its principal movement in one direction, a half-revolution during the time of the reversal of the bed at one end of its run, a second complete revolution in giving the bed the principal part of its return movement, and a half-revolution while the bed is being reversed at the other end of its run. Although experience has demonstrated such a size and relative movement to be advantageous, the same may be changed without affecting the present improvements, as may also the construction and arrangement of the rack-and-pinion mechanism.

The bed-driving pinion 10 is fast upon a sleeve that is splined to the shaft 12, so as to slide thereon and yet be rotated thereby, and it gears with a pinion 11 of two-thirds its size, that is similarly mounted upon a short shaft 14. The pinion 10 co-operates with a bed-rack 22 in moving the bed throughout the major part of its run during its printing movement and the pinion 11 co-operates with the rack 21 in moving the bed throughout the major part of its run during its non-printing movement, and as these two pinions are simultaneously moved laterally to cause them to alternately engage with the rack with which each coacts said pinion 10 is made wide enough to remain geared with the pinion 11 and permit such movements. These racks 21 22 are supported directly from the under side of the bed B, and they both face downward and are vertically arranged so as to be separated a suitable distance apart and horizontally arranged so that their pitch-lines, respectively, agree with the pitch-lines at the top of said pinions 10 11. Timely sliding movements are simultaneously imparted to the pinions 10 and 11 by means of collars attached to the sleeve of each, into which enter the branching arms of a pivoted lever 24, that is periodically vibrated by means of a cam 26 on the shaft 13, into which the opposite end of said lever is entered.

A revolving disk P, having a pocket 1, is splined fast to the end of the shaft 12, and hence runs turn for turn with the pinion 10, and it has mounted to turn freely upon its hub as a bearing a toothed wheel 27, to the face of which is fixed a revolving disk G, carrying a guard 2. Motion is imparted to said guard-disk G by means of an intermediate pinion 28, that is fast upon the shaft 14 of pinion 11 and gears with the wheel 27, which wheel 27, pinion 28, and pinion 11 are so proportioned with respect to said pinion 10 that the rotation of said guard-disk is relatively slower than that of the pinion 10 and pocket-disk—that is, the pocket-disk P makes three revolutions to one of the guard-disk—and hence it results that the tail and head of said guard will respectively coincide in position with the pocket 1 as said pocket reaches its lowest and highest positions and vice versa during the reversing operations, the object of which will be hereinafter explained.

The type-bed B is provided with two swinging levers 70 80, each pivoted to a branching arm A, depending centrally from the bed, and said bed also carries dependent at its opposite ends outwardly-curved arms, as 30 and 40, in which the free end of each of said levers is respectively guided. The free or outer end of the lever 70 is provided on one side at its end with a short right-angular or lateral stud 3, which is periodically entered into the pocket 1 of the disk P and engaged with the curved guard, as 2, of the disk G, said pocket 1 and the guard 2 forming a curved pathway, in which the said stud 3 is driven by the rotation of the pocket-disk P, and said lever end is provided on its other side and somewhat nearer its fulcrum with a stud, as 5, that moves in the guideway of or is otherwise guided by the arm 30. The outer or free end of the lever 80 is likewise provided on one side at its end with a lateral stud 6, that is periodically entered into the pocket 1 of the disk P and engaged with the curved guard 2 of the disk G, said pocket 1 and guard 2 forming a curved pathway, in which said stud 6 is driven by the pocket-disk P, and said lever 80 is provided on its other side and somewhat nearer its fulcrum with a stud 7, that moves in the guideway of or is otherwise guided by the arm 40. The pathway formed by the guard 2 is equivalent to that traveled by a crank, and consequently imparts the controlling motion of a crank to the reversing of the bed. This crank motion is, moreover, supplemented by what is tantamount to a cam motion by the action of the guiding-arc in which the stud 5 or 7 travels with respect to the bed to which it is attached as said stud 5 or 7 is driven through said arc by the action of the pocket-disk P and guard 2 imparted through the stud 3 or 6, and such compound movement renders it possible to slow down and stop the bed with great smoothness and to restart and propel the same with great ease.

In order that the levers when moved by the pocket-disk may be properly positioned for their next coaction with said pocket-disk, said levers 70 80 are extended rearward and geared together by segment-racks 35 45, so that one will be rocked by the other. Now when the stud 3 of the lever 70 enters the pocket 1 while the latter is approaching and passing its lowest point of travel, as in Fig. 4, and is rocked upward, so as to leave the said pocket when the latter is approaching and passing its highest point of travel, as in Fig. 6, the movement thus given to the lever 70 will swing its segment 35 downward, and acting through the segment 45 will cause the lever 80 to correspondingly swing upward, so as to present its stud 6 in its highest position, as in Fig. 6, which is that which it must have to enter the pocket 1 while said pocket is approaching and passing its highest point of travel, as in Fig. 8, and since its stud 6 leaves the said pocket 1 when it is approaching and passing its lowest point of travel, as in Fig. 10, it again results that the lever 80 thus made to swing will cause, through its segment-rack 45 and the segment-rack 35, such a vibration of the lever 70 as will present its stud 3 again into position to engage the pocket 1 when the latter again approaches and passes its lowest point of travel. The proper relative positions of these levers when they have been rocked up or down and are to travel free from the pocket 1 and guard 2 are maintained by guide-rails 31, 32, 33, and 34, so positioned that these studs 3 and 6 shall travel upon them during the principal part of the time the bed is making the major parts of its run in each direction.

The movements of the levers, as well as those of the various parts, will be rendered clear by the following description of the operation in connection with the diagrams Figs. 4 to 11, inclusive, wherein various parts then inactive or which would obscure others then active are either omitted, broken away, or shown by lines or dotted lines.

Figure 4:
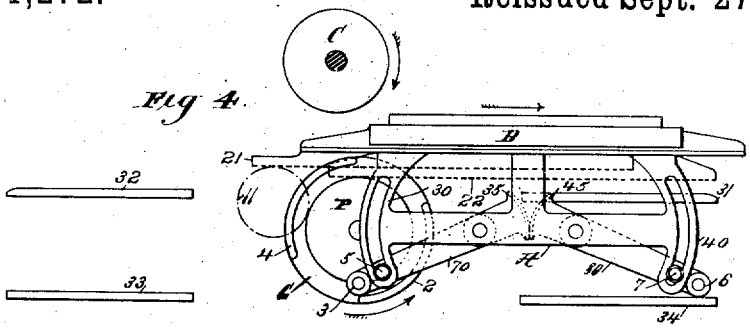

As shown in Fig. 4, the parts are in the positions they have when the bed has nearly reached the end of the major part of its non-printing run driven by the pinion 11 and rack 21, and is to be reversed by completing that movement to a state of rest and then being started in its opposite direction or that in which it runs when co-operating with the cylinder in making an impression. It being understood that the pocket-disk P and the guard-disk G turn in the same direction—that of the curved arrow—that the surface speed of the pocket-disk is equal to that imparted by the rack-and-pinion mechanism to the bed, and that the speed of the guard-disk is slower than that of the pocket-disk, the latter making three revolutions while the former makes one, it will be apparent, since the rear end of the guard 2 coincides in position with that of the pocket 1 when the latter is in its lowest position, that while the pocket-disk makes a half-revolution to bring its pocket 1 into its highest position the forward end of the guard 2 will arrive simultaneously at the same point, said guard being thus in position for the timely entrance and exit of the stud 3, and, furthermore, that this guard will perform in a like manner with respect to the stud 6 on the lever 80; also, that during the reversing operations the pinions 10 11 are moved laterally to bring the proper one into the path of travel of the rack it is to engage.

Figure 5:
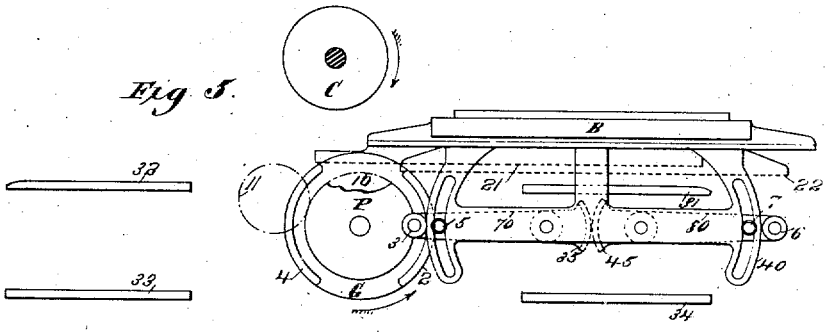

When the pocket 1 is closely approaching and passing its lowest point and the tail of guard 2 coincides in position with it, as in Fig. 4, at which time said pocket, the rack 21, and stud 3 are moving at the surface speed of the driving-pinions, the rack 21 will run out of the pinion 11 and the stud 3 will simultaneously enter the pocket 1 and pass behind the said guard 2, and while the pocket 1 makes a quarter-revolution it will carry the stud 3 in the curved or crank pathway formed by the guard 2 and compel the stud 5 to travel in the reversed curved pathway in the arm 30, thus through a compound motion imparting to the bed a movement which, gradually retarding it, brings it to a state of momentary rest, as in Fig. 5, which compound motion thus obtained becomes cam-like or of greater and hence easier sweep than is the movement imparted through a semicircular path, as by a crank. During the next quarter-revolution of the pocket 1 it will continue to move the stud 3 in the curved or crank pathway formed by the guard 2 and the stud 5 in the reversed curved pathway in the arm 30, thus starting the bed in the reverse direction and gradually accelerating it through such compound motion, and when the pocket 1 is closely approaching and passing its highest point of travel and the forward end of the guard 2 coincides with it, as in Fig. 6, at which time said pocket, the rack 22, and the stud 3 are moving at the surface speed of the driving-pinions, the rack 22 will engage the pinion 10, which has then been moved into proper alignment with it, and the stud 3 will simultaneously disengage from the pocket 1 and pass out from under the forward end of the guard 2, as in Fig. 6. The bed will then have been reversed and now be solely driven by the pinion 10 and rack 22 and carried through the major part of its run made during the printing operation, the stud 3 then running free. In the making of this reversal of the bed just described it will be observed that the levers 70 80 have been rocked from their low position in Fig. 4 to their high position in Fig. 6. The bed will now make the major part of its printing-run driven solely by the rack 22 and pinion 10, as in Fig. 7, during which the pinion 10 makes a complete revolution. During this run of the bed the levers 70 80 are maintained in this last-described position, which is the one they must have when they are to be again acted upon, by means of guard-rails 31 32, on which their studs travel while the bed is making the major part of its run in its printing direction. Thus as the stud 3 leaves the pocket 1 and guard 2 to pass outward the stud 6 of lever 80 will simultaneously enter upon the guard-rail 31 and hold the two levers 70 80 in their highest positions. Said stud 6 will travel on the rail 31 as the bed moves onward, and when said stud 6 is about leaving the rail 31 the stud 3 will in like manner enter onto the rail 32, as in Fig. 7, and hold the levers in place until the stud 6 is engaged by the pocket-disk 1, as in Fig. 8, when the bed, having completed the major part of its printing-run, requires to be stopped and reversed, during which operation the pinions 10 and 11 are moved laterally, so as to present the pinion 11 in the pathway of the rack 21. When the pocket 1 is again closely approaching and passing its highest point and the tail of the guard 2 coincides in position with it, as in Fig. 8, at which time said pocket, the rack 21, and the stud 6 are moving at the surface speed of the driving-pinions, the rack 22 will run out of the pinion 10 and the stud 6 will simultaneously enter the pocket 1 and pass behind the said guard 2, and while the pocket makes a quarter-revolution it will carry the stud 6 in the curved or crank pathway formed by the guard 2 and compel the stud 7 to travel in the reversed curved pathway in the arm 40, thus through a compound motion imparting to the bed a movement which, gradually retarding it, brings it to a state of momentary rest, as in Fig. 9. During the next quarter-revolution of the pocket 1 it will continue to move the stud 6 in the curved or crank pathway formed by the guard 2, and the stud 7 will travel in the reversed curved pathway in the arm 40, thus starting the bed in the reverse direction and gradually accelerating it through such compound motion, and when the pocket 1 is closely approaching and passing its lowest point of travel and the head of the guard 2 coincides with it, as in Fig. 10, at which time said pocket, the rack 22, and the stud 6 are moving at the surface speed of the driving-pinions, the rack 21 will engage the pinion 11, which has then been moved into proper alignment with it, and the stud 6 will simultaneously disengage from the pocket 1 and pass out from the head end of the guard 2, as in Fig. 10. The bed will then have been reversed and now be solely driven by the pinion 11 and rack 21, and carried through the major part of its run made during its non-printing movement, the stud 6 then running free, and at the end of this movement the parts will have arrived in the positions shown in Fig. 4, which are those from which the description of their operation was begun.

Figure 6:
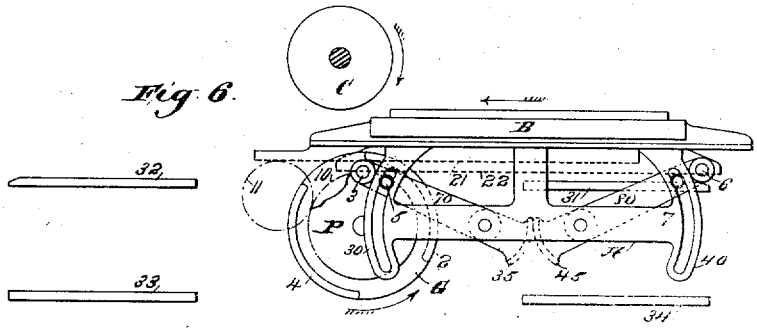
Figure 7:
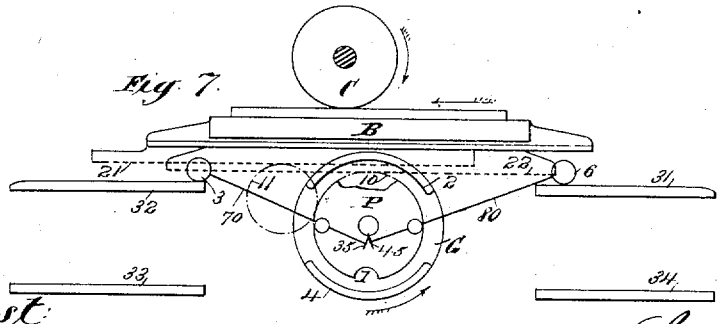
Figure 8:
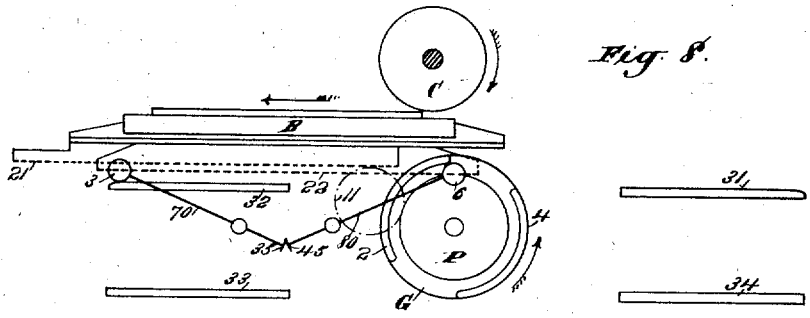
Figure 9:
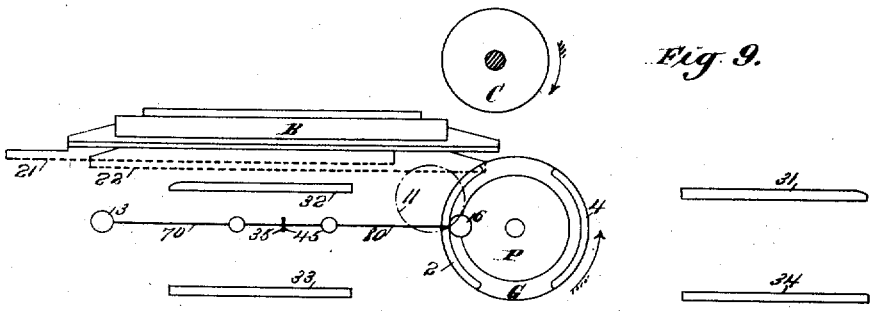
Figure 10:
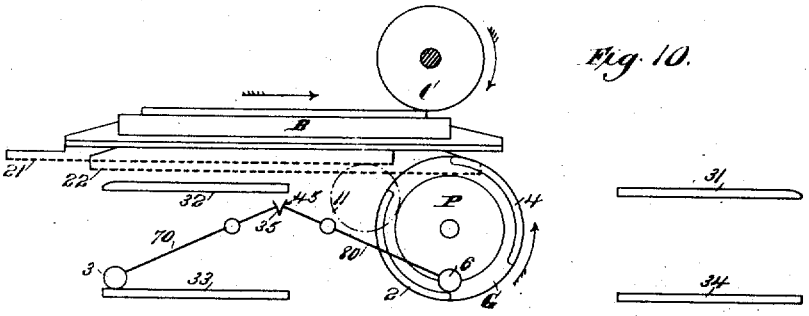
Figure 11:
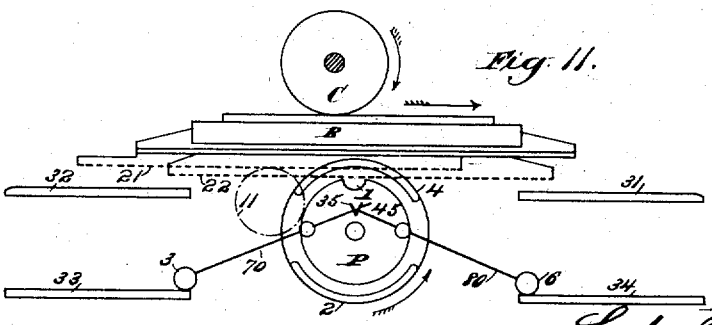

In making the reversal of the bed just described the levers 70 80 were rocked from their high position in Fig. 6 to their low position in Fig. 10, in which latter position (that which they must have when again acted upon) they are maintained by means of guard-rails 33 34, upon which their studs travel while the bed is making the greater part of its return movement. Thus as the stud 6 is leaving the pocket 1 and passing from the the guard 2 the stud 3 will simultaneously bear upon guard-rail 33, and thus hold the two levers 70 80 in their lowest positions. Said stud 3 will then travel on the rail 33 as the bed moves onward, and when said stud 3 is about leaving the rail 33 the stud 6 will in like manner bear upon the rail 34, as in Fig. 11, and hold the levers in place until the stud 3 is engaged by the pocket 1, as in Fig. 4, when the bed, having completed the greater part of its non-printing or return run, requires to be again reversed. The guard-disk is provided with a duplicate guard 4, arranged opposite to the guard 2, which latter has been described as the active guard. When the active guard, as 2, is disabled or worn, the guard, as 4, may replace it by slipping the gears, and at all times the inactive guard acts as a counter-balance for the active guard.

Herein the rack-and-pinion mechanism embodies two racks and two driving-pinions. It is obvious that other constructions may be used, as is explained and illustrated in my application, Serial No. 421,914, filed February 8, 1892. It may now be stated that the curved guide 30 or 40 may, instead of having a slot, be a single member, against which the stud, as 5 or 7, bears, or that it may be embraced by a stud bearing on its opposite sides. It may also be remarked that while such curved guides may be entirely omitted their use is preferred.

Of course the pocket-disk might be an arm of dimensions sufficient to carry the semicircular pocket 1, and the terms "pocket," "disk," or "pocket-disk" are therefore to be regarded as embracing such a construction.

The subject-matter hereof is broadly embraced by my application, Serial No. 432,145, filed May 7, 1892, and hence the following is alone claimed herein.

It will be obvious that this invention is applicable in whole or in part wherever a reciprocating member is employed in machines other than printing-machines—as, for instance, in a planer.

What I claim is—

1. The combination, with the reciprocating bed, of two levers pivoted to the bed and geared together so as to swing concertedly, a revolving disk having a pocket, and a revolving guard co-operating with said pocket to alternately engage the outer ends of said levers and reverse the movement of the bed at each end of its run by retarding, stopping, starting, and accelerating the same, substantially as described.

2. The combination, with the reciprocating bed, of two levers pivoted to the bed and geared together so as to swing concertedly, a revolving disk having a pocket, a revolving guard co-operating with said pocket to alternately engage the outer ends of said levers, and a curved guide at each end of the bed, in which the outer ends of said levers travel, whereby the motion of the bed is reversed at each end of its run, substantially as described.

3. The combination, with the bed and a rack-and-pinion mechanism for driving it during the major part of its reciprocation, of two levers pivoted to the bed and geared together so as to swing concertedly, a revolving disk having a pocket, and a revolving guard co-operating with said pocket to alternately engage the outer ends of said levers and reverse the movement of the bed at each end of its run by retarding, stopping, starting, and accelerating the same, substantially as described.

4. The combination, with the bed and a rack-and-pinion mechanism for driving it during the major part of its reciprocation, of two levers pivoted to the bed and geared together so as to swing concertedly, a revolving disk having a pocket, a revolving guard co-operating with said pocket to alternately engage the outer ends of said levers, and a curved guide at each end of the bed, in which the outer ends of said levers travel, whereby the motion of the bed is reversed at each end of its run, substantially as described.

5. The combination, with the moving bed, the two levers pivoted thereto and connected so as to conjointly swing in opposite directions, a revolving pocket, and a revolving guard co-operating therewith, of guide-rails, as 31 32 or 33 34, for supporting said levers in the upper or lower positions to which they are moved by the pocket and guard, substantially as described.

6. The combination, with the reciprocating bed, two levers pivoted thereto and connected so as to conjointly swing in opposite directions, a revolving pocket, and a revolving guard co-operating therewith, of guide-rails 31, 32, 33, and 34 for supporting said levers in the upper and lower positions to which they are moved by the pocket and guards, substantially as described.

7. The combination of the pocket-disk, shaft 12, pinions 10 11, shaft 13, pinion 28, and movable guard-disk, substantially as described.

In testimony whereof I have hereunto set my hand in the presence of two subscribing witnesses.

LUTHER C. CROWELL.

Witnesses:

NATHANIEL ATWOOD,

G. R. STEDMAN.